United States Patent [19]
Lane

[11] 3,973,287
[45] Aug. 10, 1976

[54] HEADLAMP WIPER ASSEMBLIES

[75] Inventor: Robert John Lane, Birmingham, England

[73] Assignee: Joseph Lucas (Electrical) Limited, Birmingham, England

[22] Filed: Dec. 8, 1972

[21] Appl. No.: 313,570

[30] Foreign Application Priority Data
Dec. 8, 1971 United Kingdom............... 56917/71

[52] U.S. Cl............................. 15/250.25; 15/250 A
[51] Int. Cl.²......................................... B60S 1/20
[58] Field of Search....... 15/250.16, 250.17, 250.25, 15/250.3, 250.31, 250 A

[56] References Cited
UNITED STATES PATENTS

| | | | |
|---|---|---|---|
| 3,058,142 | 10/1962 | Pollock | 15/250.30 |
| 3,289,237 | 12/1966 | Lindsey | 15/250 A |
| 3,456,278 | 7/1969 | Mandy et al. | 15/250 A |
| 3,599,269 | 8/1971 | Congdon | 15/250.3 X |
| 3,641,613 | 2/1972 | Povilaitis et al. | 15/250.02 |
| 3,686,704 | 8/1972 | Sharpe et al. | 15/250.3 X |
| 3,825,971 | 7/1974 | Ursel et al. | 15/250.35 |

Primary Examiner—Christopher K. Moore
Attorney, Agent, or Firm—Holman & Stern

[57] ABSTRACT

A headlamp wiper assembly for a motor vehicle having twin headlamp units. The assembly comprises a backing plate having a pair of apertures therein to accommodate the twin headlamp and a further offset aperture which accommodates a wheel box unit. A shaft of the wheel box unit carries a single wiper blade and is oscillatable through substantially 180° so that the wiper blade can clean both headlamps. The wiper blade is parked, when not in use, so as not to obscure the headlamps.

5 Claims, 2 Drawing Figures

HEADLAMP WIPER ASSEMBLIES

This invention relates to headlamp wiper assemblies for use on vehicles having twin headlamp units.

According to the present invention, there is provided a headlamp wiper assembly for a twin headlamp unit, comprising a backing plate having a pair of spaced apertures therein to accommodate the twin headlamps, a bearing unit fixed relative to the backing plate, a shaft mounted in the bearing unit for angular oscillatory movement and extending through a further aperture in the backing plate, said aperture being disposed between the pair of headlamp apertures and offset from the plane in which the axes of the headlamp apertures lie, and a wiper mounted on the shaft.

Most advantageously, the assembly is so arranged that, when in position, the wiper does not obscure the headlamps when the assembly is not in operation.

Figure 1:
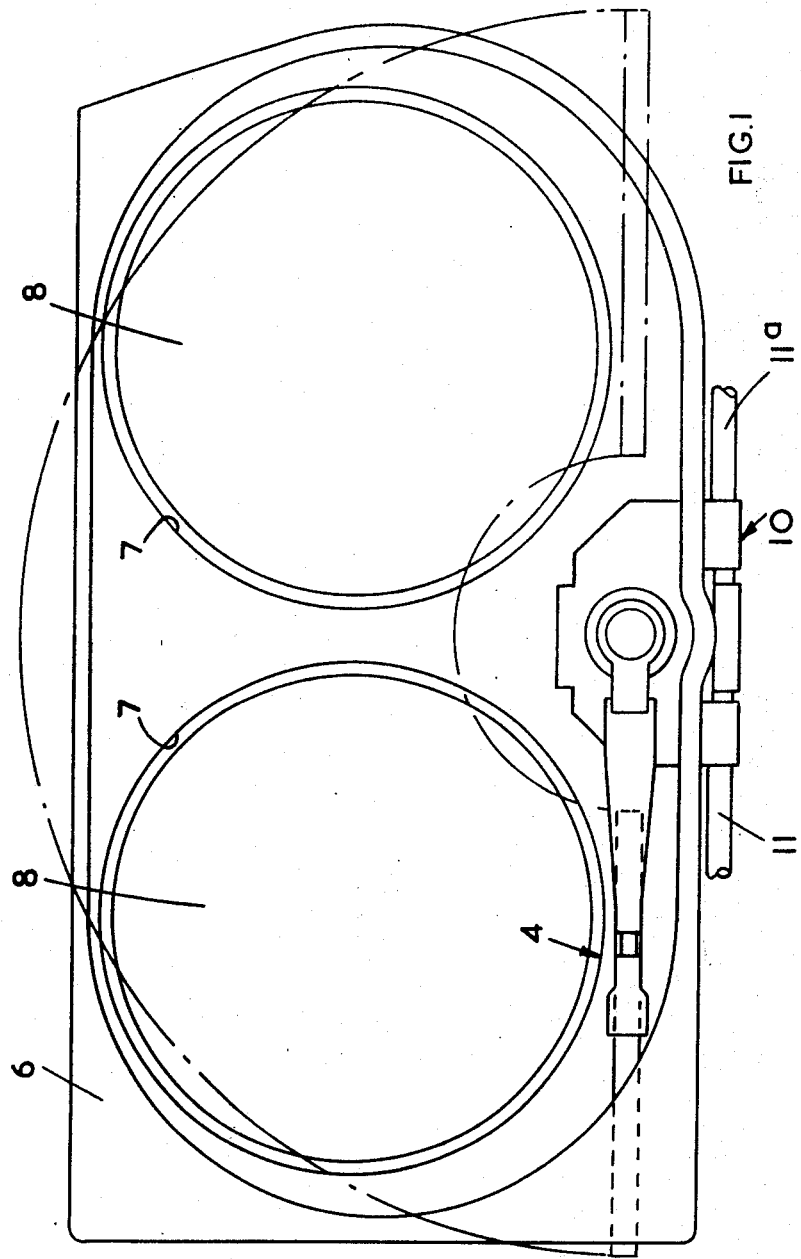
Figure 2:
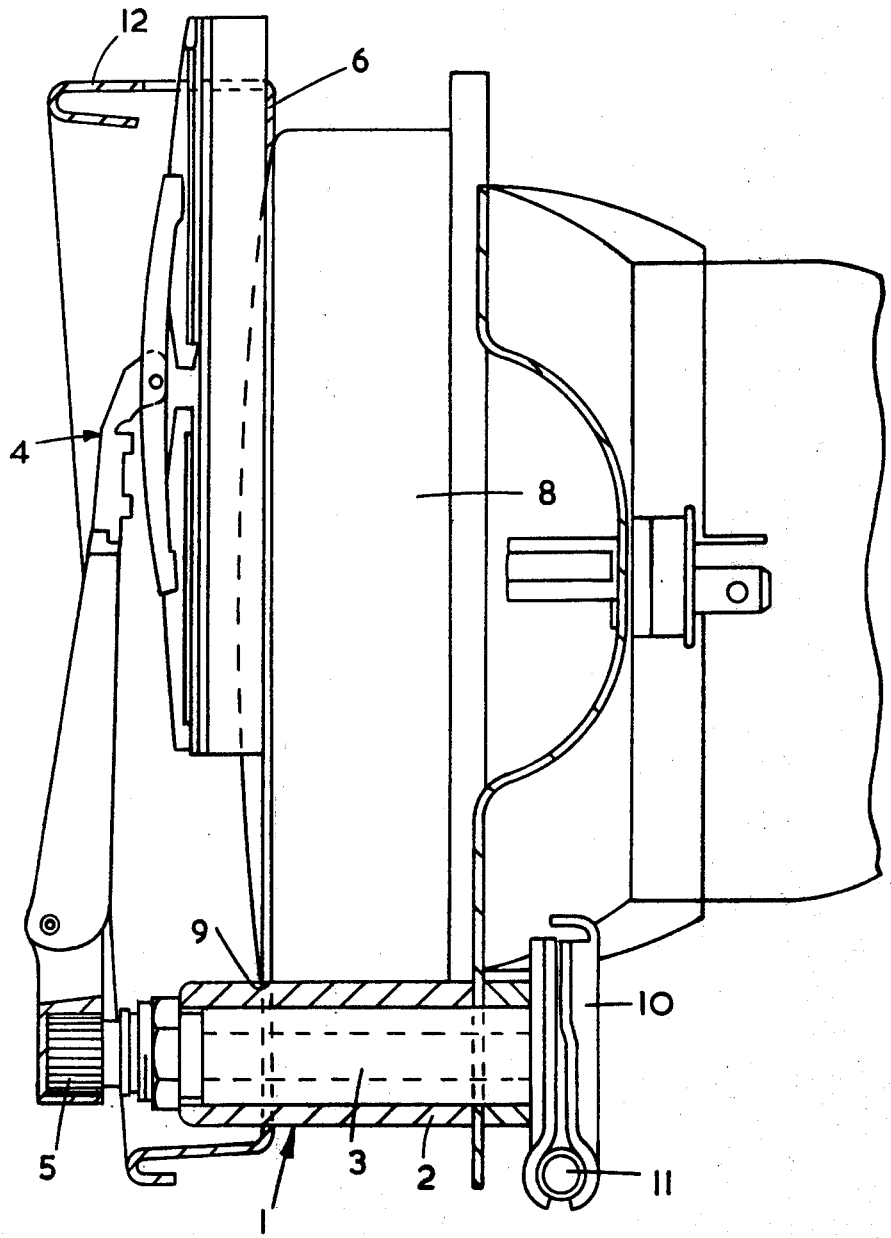

An embodiment of the present invention will now be described, by way of example, with reference to the accompanying drawings, in which:

FIG. 1 is a plan view of a headlamp wiper assembly according to the present invention, and FIG. 2 is a sectional view of the headlamp wiper assembly shown in FIG. 1.

Referring to the drawings, the headlamp wiper assembly is for a motor vehicle provided with twin headlamp units. The assembly comprises a wheel box unit 1 formed by a stationary bearing 2 housing a shaft 3, and a wiper 4 which is mounted on the shaft 3 through the intermediary of a splined connection 5. The headlamp wiper assembly also includes a backing plate 6 provided with a pair of spaced apertures 7 for accommodating a pair of headlamps 8. The arrangement is such that the base of the backing plate 6 is substantially flush with the surface of the headlamps 8. The backing plate 6 is also provided with a further aperture 9 which is disposed between the apertures 7 and offset from a plane containing the axes of the apertures 7. The aperture 9 accommodates the shaft 3 which extends therethrough on one side to be connected with a clamp 10 rotatable with the shaft 3 to enable the shaft 3 to be operably connected with a rack cable 11. In this manner, angular oscillatory movement of the shaft 3 can be effected by longitudinal reciprocation of the rack cable 11 in known manner. The assembly is so arranged that an angular oscillatory movement of the shaft 3 through substantially 180° is obtained whereby full wiping of each headlamp 8 is effected by the wiper 4. Furthermore, when the wiper assembly is not actually in operation, i.e., the wiper is in its rest or "parked" position, it does not obscure either of the headlamps 8 (as shown in FIG. 1).

In the embodiment described above, the backing plate 6 is provided with an upstanding rim 12 which is apertured to allow passage of the wiper 4. In an alternative embodiment of the invention (not shown), if the design of the vehicle headlamp units permits, the backing plate is extended laterally and upwardly so that the upstanding rim 12 of the backing plate 6 lies outside the path of movement of the wiper whereby the provision of an aperture in the upstanding rim 12 is obviated.

It will be appreciated that a single electric motor, such as that employed to operate the windscreen wipers of a motor vehicle, may be provided to operate two sets of headlamp wiper assemblies of the type described above, the extension of the rack cable 11 to the other headlamp wiper assembly on the vehicle is indicated at 11a in FIG. 1.

I claim:

1. A headlamp wiper assembly for a twin headlamp unit, comprising a backing plate having a pair of spaced headlamp apertures therein to accommodate the twin headlamp unit said headlamp apertures having axes extending perpendicularly with respect to a plane in which the headlamp apertures lie, a bearing unit fixed relative to said backing plate, a shaft mounted in said bearing unit for angular oscillatory movement and extending through a further aperture in said backing plate, said further aperture being disposed between said pair of headlamp apertures and offset from a plane in which said axes lie, and a single wiper mounted on said shaft, and means for oscillating said shaft through a large angle such that said single wiper wipes both headlamps in use.

2. The assembly according to claim 1, wherein said wiper is adapted to rest clear of said headlamp apertures when the assembly is not in operation.

3. The assembly according to claim 1, wherein said means for oscillating said shaft is arranged to oscillate said single wiper through an angle of substantially 180°.

4. The assembly according to claim 1, wherein said means for oscillating comprises a rack cable.

5. The assembly according to claim 4, wherein said rack cable has an extension for driving another headlamp wiper assembly whereby two twin headlamp units can be wiped using one motor for driving the wipers.

* * * * *